US011281490B2

(12) United States Patent
Arroyo et al.

(10) Patent No.: US 11,281,490 B2
(45) Date of Patent: Mar. 22, 2022

(54) DYNAMIC ASSIGNMENT OF INTERRUPTS BASED ON INPUT/OUTPUT METRICS

(71) Applicant: International Business Machines Corporation, Armonk, NY (US)

(72) Inventors: Jesse Arroyo, Rochester, MN (US); Prathima Kommineni, Hyderabad (IN); Timothy M. Schimke, Stewartville, MN (US); Shyama Venugopal, Hyderabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/128,394

(22) Filed: Dec. 21, 2020

(65) Prior Publication Data
US 2021/0149713 A1    May 20, 2021

Related U.S. Application Data

(63) Continuation of application No. 16/382,182, filed on Apr. 11, 2019, now Pat. No. 11,204,796.

(51) Int. Cl.
*G06F 9/48* (2006.01)
*G06F 9/50* (2006.01)
*G06F 9/455* (2018.01)
*G06F 13/24* (2006.01)

(52) U.S. Cl.
CPC ........ *G06F 9/4812* (2013.01); *G06F 9/45558* (2013.01); *G06F 9/5077* (2013.01); *G06F 13/24* (2013.01); *G06F 2009/45579* (2013.01); *G06F 2213/0026* (2013.01)

(58) Field of Classification Search
CPC .. G06F 9/4812; G06F 9/45558; G06F 9/5077; G06F 13/24; G06F 2009/45579; G06F 2213/0026
See application file for complete search history.

(56) References Cited

U.S. PATENT DOCUMENTS

| 6,219,743 | B1 | 4/2001 | Kennel et al. |
| 9,032,127 | B2 | 5/2015 | Fischer et al. |
| 9,063,918 | B2 | 6/2015 | Jacobs et al. |
| 9,069,741 | B2 | 6/2015 | Williamson |
| 9,355,050 | B2 | 5/2016 | Zeng et al. |

(Continued)

OTHER PUBLICATIONS

Zou et al.; "A Source-aware Interrupt Scheduling for Modern Parallel I/O Systems", 2012 IEEE 26th International Parallel and Distributed Processing Symposium, p. 156-166, 2012.

(Continued)

*Primary Examiner* — Henry Tsai
*Assistant Examiner* — Aurangzeb Hassan
(74) *Attorney, Agent, or Firm* — Jeffrey M. Ingalls

(57) ABSTRACT

A system and method dynamically assign interrupts to a virtual machine from an input/output (I/O) adapter based on I/O metrics of the I/O adapter. An interrupt manager monitors I/O adapter traffic flow metrics such as latency of data transfers, usage levels, and transfers per unit of time. The interrupt manager determines when a traffic flow metric for a virtual machine meets a predetermined performance threshold and updates virtual interrupt assignments in a logical interrupt table to improve performance of the system.

15 Claims, 5 Drawing Sheets

(56) References Cited

U.S. PATENT DOCUMENTS

| | | | |
|---|---|---|---|
| 9,411,624 B2 | 8/2016 | Tsirkin | |
| 9,710,408 B2 | 7/2017 | Veal et al. | |
| 9,715,469 B1 | 7/2017 | Arroyo et al. | |
| 9,720,862 B1 | 8/2017 | Arroyo et al. | |
| 10,545,893 B1* | 1/2020 | Xu | G06F 11/1497 |
| 2005/0223269 A1 | 10/2005 | Stolowitz | |
| 2006/0195644 A1* | 8/2006 | Arndt | G06F 13/24 710/260 |
| 2009/0144731 A1 | 6/2009 | Brown et al. | |
| 2010/0023666 A1 | 1/2010 | Mansell et al. | |
| 2011/0126203 A1 | 5/2011 | Fahrig | |
| 2011/0145462 A1 | 6/2011 | Mukherjee et al. | |
| 2011/0197003 A1* | 8/2011 | Serebrin | G06F 13/24 710/267 |
| 2014/0173338 A1 | 6/2014 | Arroyo et al. | |
| 2014/0223060 A1 | 8/2014 | Tsirkin et al. | |
| 2014/0229938 A1 | 8/2014 | Tsirkin et al. | |
| 2015/0356038 A1 | 12/2015 | Feehrer et al. | |
| 2016/0321203 A1 | 11/2016 | Li et al. | |
| 2017/0083363 A1 | 3/2017 | Li | |
| 2017/0102963 A1 | 4/2017 | Zhang et al. | |
| 2017/0206177 A1 | 7/2017 | Tsai et al. | |
| 2017/0212851 A1 | 7/2017 | Jayasena et al. | |
| 2017/0242756 A1 | 8/2017 | Arroyo et al. | |
| 2018/0113823 A1 | 4/2018 | Arroyo et al. | |

OTHER PUBLICATIONS

Cheng et al.; "vBalance: Using Interrupt Load Balance to Improve I/O Performance for SMP Virtual Machines", SOCC'12, 2012.

Tu et al.; "A Comprehensive Implementation and Evaluation of Direct Interrupt Delivery", VEE'15, 2015.

Gordon et al.; "ELI: Bare-Metal Performance for I/O Virtualization", ASPLOS'12, p. 411-422, 2012.

Arroyo et al., "Dynamic Assignment of Interrupts Based on Input/Output Metrics" U.S. Appl. No. 16/382,182, filed Apr. 11, 2019.

Arroyo et al., "Dynamic Assignment of Interrupts Based on Input/Output Metrics" U.S. Appl. No. 16/524,501, filed Jul. 29, 2019.

Appendix P—List of IBM Patents or Patent Applications Treated as Related, dated Jan. 23, 2021.

Li et al., "When 1/0 Interrupt Becomes System Bottleneck: Efficiency and Scalability Enhancement for SR-IOV Network Virtualization", Jun. 2017, IEEE. (Year: 2017), 14 pages.

Li et al., "vINT: Hardware-Assisted Virtual Interrupt Remapping for SMP VM with Scheduling Awareness", 2015, IEEE. (Year: 2015), 8 pages.

\* cited by examiner

DYNAMIC ASSIGNMENT OF INTERRUPTS BASED ON INPUT/OUTPUT METRICS

BACKGROUND

1. Technical Field

This disclosure generally relates to computing system testing, and more specifically relates to a system and method for dynamic assignment of interrupts to a virtual machine from an input/output (I/O) adapter based on input/output metrics of the I/O adapter.

2. Background Art

A logical partition is often configured to utilize a virtual I/O adapter such as a virtualized I/O network adapter. In current server-class systems there are large I/O fabrics incorporating many layers of bridge chips, switches, and I/O devices. The I/O devices themselves may be further virtualized in technologies such as Single-Root Input/Output Virtualization (SR-IOV). The routing and handling of interrupts generated by I/O devices involves both hardware configuration and software configuration across many layers of the system including the hypervisor and logical partition. When the system is provisioned, assignments are made for which physical interrupts are associated with which I/O devices and which logical interrupts are associated with which physical interrupt. During operation, high rate data transfers can cause congestion of interrupts from an I/O device and contribute to high latency of the logical interrupts reaching the associated VM in the partition. This latency can cause poor overall performance of the system.

BRIEF SUMMARY

A method and system provide dynamic assignment of interrupts to a virtual machine from an I/O adapter based on I/O metrics of the I/O adapter. An interrupt manager monitors I/O flow metrics on an I/O adapter such as latency of data transfers, usage levels, and transfers per unit of time. The interrupt manager determines when a traffic flow metric for a virtual machine meets a predetermined performance threshold and updates virtual interrupt assignments in a logical interrupt table to improve performance of the system.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The disclosure and claims herein relate to a method and system for dynamic assignment of interrupts to a virtual machine from an I/O adapter based on I/O metrics of the I/O adapter. An interrupt manager monitors I/O flow metrics on an I/O adapter such as latency of data transfers, usage levels, and transfers per unit of time. The interrupt manager determines when a traffic flow metric for a virtual machine meets a predetermined performance threshold and updates virtual interrupt assignments in a logical interrupt table to improve performance of the system.

Figure 1:
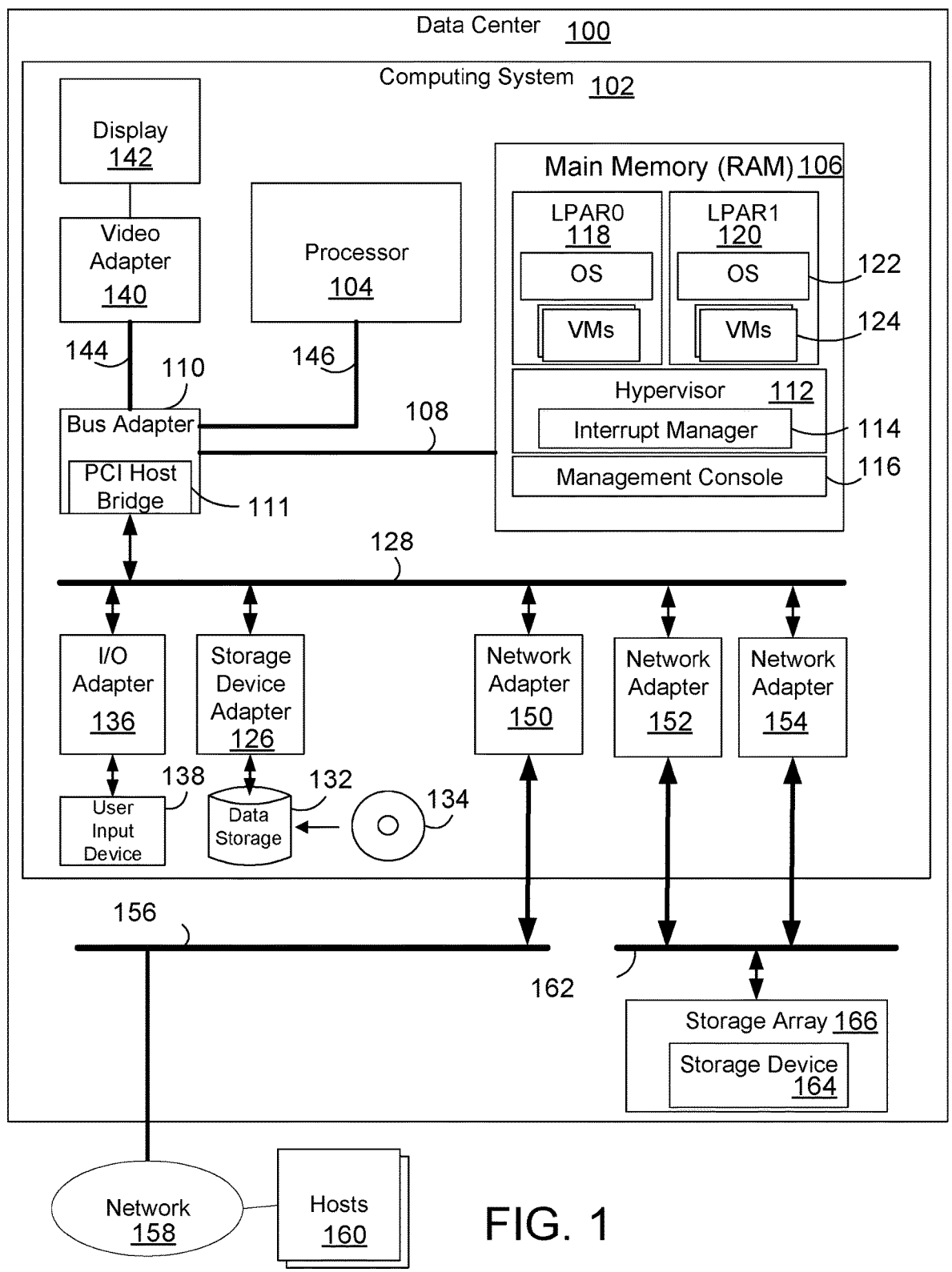
FIG. 1 illustrates an example data center with a computing system configured for dynamic assignment of interrupts to a virtual machine from an input/output adapter based on I/O metrics of the input/output adapter.

FIG. 1 illustrates an example data center 100 which includes a computing system 102 configured for dynamic assignment of interrupts to a virtual machine from an I/O adapter based on I/O metrics of the I/O adapter according to embodiments of the present invention. The computing system 102 includes at least one processor 104 or "CPU". The computing system further includes main memory 106 (random access memory) which is connected through a high speed memory bus 108 and bus adapter 110 to processor 104 and to other components of the computing system 102. The bus adapter 110 may include a peripheral component interconnect (PCI) host bridge 111 as described further below.

Processor 104 may be constructed from one or more microprocessors and/or integrated circuits. Processor 104 executes program instructions stored in main memory 106. Main memory 106 stores programs and data that processor 104 may access. Although computing system 102 is shown to contain only a single processor those skilled in the art will appreciate that the system may be practiced using a computing system that has multiple processors and/or multiple buses. In addition, the interfaces that are used preferably each include separate, fully programmed microprocessors that are used to off-load compute-intensive processing from processor 104. However, those skilled in the art will appreciate that these functions may be performed using input/output adapters as well.

Again referring to FIG. 1, main memory 106 may also include a hypervisor 112 with an interrupt manager 114 and a management console 116. The interrupt manager 114 provides dynamic assignment of interrupts to a virtual machine from an input/output (I/O) adapter based on I/O metrics of the adapter as described further below. The management console 116 may provide a user interface through which a user may direct the hypervisor 112 on instantiating and maintaining multiple logical partitions 118, 120, where each logical partition may provide virtualization services to one or more clients. The management console 116 may also provide data for the interrupt manager 114 as described further below.

Main memory 106 also includes one or more instances of an operating system (OS) 122. Typically there is one instance of the OS for each logical partition 118, 120. Operating systems useful in computers configured for interrupt migration according to various embodiments include UNIX™, Linux™, Microsoft Windows™, AIX™, IBM's IBM i™ operating system, and others as will occur to those skilled in the art. The operating systems 122, hypervisor 112, and management console 116 are shown in main memory 106, but many components of such software may typically be stored in non-volatile memory such as, for example, on a data storage device or in firmware.

The computing system 102 may also include a storage device adapter 126 coupled through expansion bus 128 and bus adapter 110 to processor 104 and other components of the computing system 102. Storage device adapter 126 connects non-volatile data storage in the form of data storage device 132 to devices in the computing system 102. Storage device adapters useful in computing systems configured for interrupt migration according to various embodiments include Integrated Drive Electronics ("IDE") adapters, Small Computing system Interface ("SCSI") adapters, and others as will occur to those skilled in the art. Non-volatile data storage 132 may be an optical disk drive, electrically erasable programmable read-only memory (so-called "EEPROM" or "Flash" memory), RAM drives, and so on, as will occur to those skilled in the art. For example, the data storage device 132 may include a compact disk re-writable (CD-RW) drive, which may store data to and read data from a removable media CD-RW 134. Some data storage devices may have a removable memory card or similar instead of the CD-RW drive.

The example computing system 102 may also include one or more input/output ("I/O") adapters 136. I/O adapters implement user-oriented input/output through, for example, software drivers and computer hardware for controlling output to display devices such as computer display screens, as well as user input from user input devices 138 such as keyboards and mice. The example computing system 102 may also include a video adapter 140, which may be an example of an I/O adapter specially designed for graphic output to a display device 142 such as a display screen or computer monitor. Video adapter 140 may be connected to processor 104 through a high speed video bus 144, bus adapter 110, and the front side bus 146, which may also be a high speed bus.

The example computing system 102 of FIG. 1 also includes several I/O adapters in the form of network adapters 150, 152, 154. The network adapters 150, 152, 154 may be implemented as Single-Root I/O virtualization (SR-IOV) adapters as described below. Any of the example network adapters from among network adapters 150, 152, 154 may be configured to support SR-IOV and provide multiple virtual functions, where each of the virtual functions may be mapped to a respective logical partition 118, 120. In this way, each of the logical partitions may independently use a physical network adapter that is being shared among different logical partitions. Such network adapters may also be configured for data communications with other computers or devices. Such data communications may be carried out serially through RS-232 connections, through external buses such as a Universal Serial Bus ("USB"), through PCI and PCIe fabrics, through data communications networks such as IP data communications networks, and in other ways as will occur to those skilled in the art. Network adapters may implement the hardware level of data communications through which one computer sends data communications to another computer, directly or through a data communications network. Examples of communications adapters useful in computers configured for interrupt migration according to various embodiments include moderns for wired dial-up communications, Ethernet (IEEE 802.3) adapters for wired data communications, and 802.11 adapters for wireless data communications. For example, network adapter 150 may be configured for data communications with hosts 160 over a network 158 reachable through local area networks (LANs), such as LAN 156. The network adapters 152, 154 may further be configured for data communications with storage area networks (SANs), such as SAN 162, and for data communications with various storage devices, such as storage device 164 in storage array 166.

One example type of I/O adapter or network adapter that may be used as described herein is an SR-IOV adapter. Readers will recognize that such SR-IOV adapters are only an example of a type of I/O adapter and that many different types of I/O adapters could be used. SR-IOV or single-root I/O virtualization, is an extension to the PCI Express (PCIe) specification. SR-IOV allows a device, such as a input/output adapter, to separate access to its resources among various PCIe hardware functions. These functions consist of the following types: a PCIe physical function (PF) and a PCIe virtual function (VF). The physical function advertises the device's SR-IOV capabilities. Each virtual function is associated with a device's physical function. A virtual function shares one or more physical resources of the device, such as a memory and a network port, with the PF and other VFs on the device. From the perspective of a logical partition 118, 120 instantiated by a hypervisor 112, a VF appears as a fully functional physical PCIe adapter. In this way, a single physical adapter may be 'shared' amongst many logical partitions or multiple virtual functions may be instantiated for use by a single logical partition.

When configuring a logical partition for interrupts with an I/O adapter, the hypervisor, upon instantiation of the logical partition may assign to the logical partition a number of logical interrupt source numbers, where each of the logical interrupt source numbers maps to a physical interrupt source number. The physical interrupt source number is a number, or identifier, that represents an interrupt raised in the processor by an I/O adapter. Such interrupts may be raised through various busses and in various ways. For example, some physical interrupts may be raised by asserting, by an adapter, a signal on a line of a bus dedicated for such interrupts or by sending an MSI (Message Signaled Interrupt) or MSI-X (MSI extended) message to the processor over the main system bus (through a PCI host bridge, for example) rather than on a dedicated interrupt line. Such MSI and MSI-X messages may be associated with a physical interrupt source number. That is, each adapter may send out an MSI or MSI-X message to raise an interrupt, the content of the message may indicate the source of the message and be associated with at least one physical interrupt source number. The CPU may then raise an interrupt with the physical interrupt source number. The interrupt my cause system firmware or software, such as the hypervisor, to handle the interrupt. The hypervisor may determine which logical partition to which to direct the interrupt based on mappings of physical interrupt source numbers to logical interrupt source numbers, where each logical interrupt source number is assigned to a logical partition.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those skilled in the art. Various embodiments of the present invention may be implemented on a variety of hardware platforms in addition to those illustrated in FIG. 1.

Computing system 102 utilizes well known virtual addressing mechanisms that allow the programs of computing system 102 to behave as if they only have access to a large, single storage entity instead of access to multiple, smaller storage entities such as main memory 106, data storage 132 and storage device 164. Therefore, while operating hypervisor 112, interrupt manager 114, management console 116, and other elements are shown to reside in main memory 106, those skilled in the art will recognize that these items are not necessarily all completely contained in main memory 106 at the same time. It should also be noted that the term "memory" is used herein generically to refer to the entire virtual memory of computing system 102, and may include the virtual memory of other computing systems coupled to computing system 102.

As introduced above, the example computing system of FIG. 1 includes a management console 116. The management console 116 as shown is implemented as software but may also be implemented as a module of automated computing machinery comprising computer hardware and software. The management console 116 may provide a user interface through which a user may direct the hypervisor 112 on instantiating and maintaining logical partitions, where each logical partition may provide virtualization services to one or more clients. The management console 116 may also monitor traffic flow metrics of the various I/O adapters to be used as described further below.

Also introduced above, the computing system 102 includes a hypervisor 112. The hypervisor 112 supports execution of the logical partitions 118, 120. The logical partitions are configured to use the network adapters 150, 152, 154 for I/O operations. Upon instantiation of the logical partition, the hypervisor 112 may assign one or more logical interrupt source numbers to the logical partition. The logical partition is generally unaware that the logical interrupt source numbers are, in fact, logical. The hypervisor may map each of the logical interrupt source numbers to a physical interrupt source number that is generated in the processor of the computing system 102 when an interrupt is raised by an I/O adapter. The mapping and conversion of logical and physical interrupts is further described with reference to FIG. 2.

Figure 2:
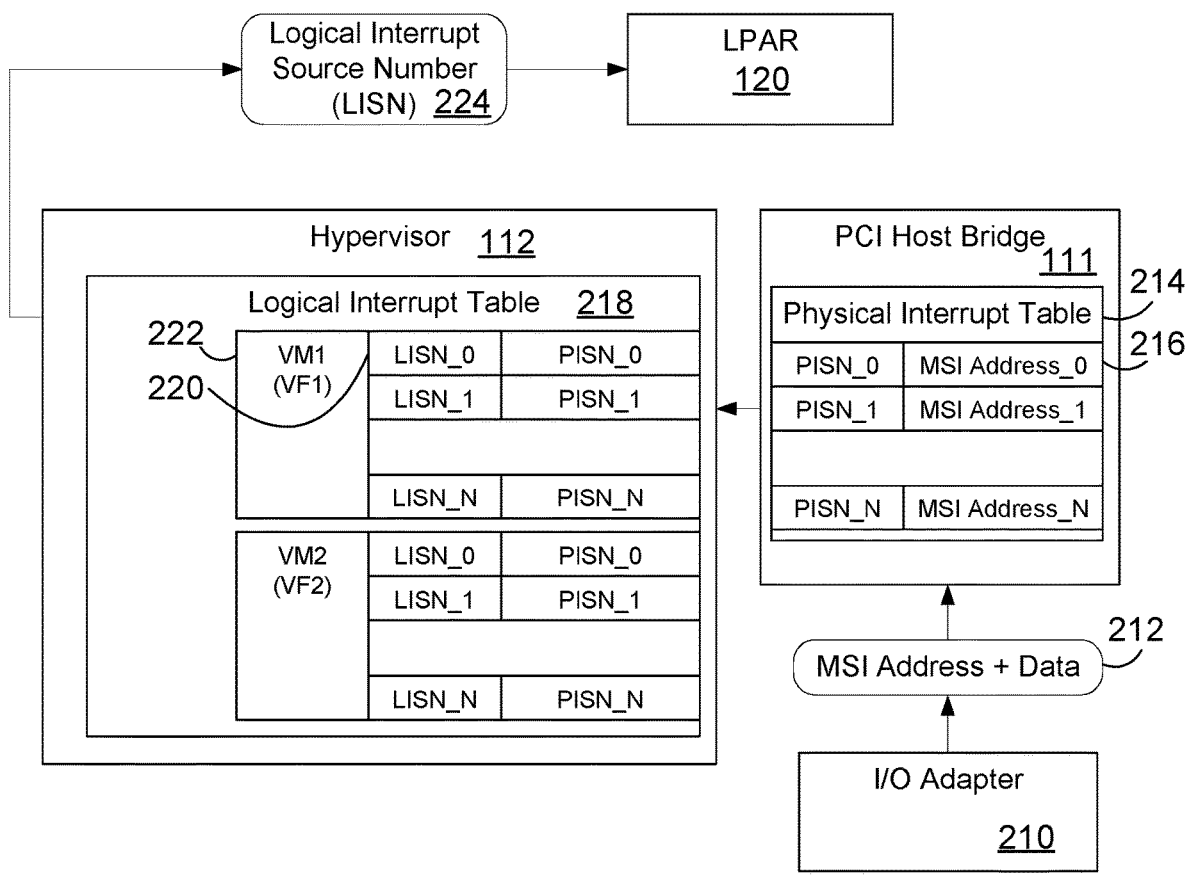
FIG. 2 is a block diagram that illustrates physical to logical interrupt conversion in a system such as the computing system shown in FIG. 1.

FIG. 2 is a block diagram to illustrate physical to logical interrupt conversion in a system such as computing system 102 shown in FIG. 1. The entities in FIG. 2 correspond to entities with the same name and reference designators shown in FIG. 1. I/O adapter 210 represents one of the adapters 126, 136, 150, 152 154 shown in FIG. 1. A physical interrupt to the I/O adapter 210 is converted to a logical interrupt that is sent to the logical partition 120. When an interrupt occurs at the I/O adapter 210, the I/O adapter 210 outputs an Message Signal Interrupt (MSI) address and data 212 associated with the interrupt. The PCI host bridge 111 receives the MSI address and data 212 of the interrupt, and using the address included in the interrupt as an index, looks up an associated physical interrupt source number in a physical interrupt table 214. The host processor (not shown) allots a number of physical interrupt source numbers to PCI peripherals such as the I/O adapter 210. The PCI host bridge 111 upon enumerating an I/O adapter 210 to the system, assigns one or more addresses to be used for MSI in the PCI configuration space of the I/O adapter and associates each address with one of the allotted physical interrupt source numbers. Such associations are stored, in the example of FIG. 2, in records of a physical interrupt table 214. In this example, the physical interrupt table 214 is located in the PCI host bridge 111 which is part of the bus adapter 110 in FIG. 1.

Again referring to FIG. 2, the hypervisor 112, upon instantiating a logical partition 120 and provisioning the I/O adapter 210 to the logical partition 120, assigns one or more logical interrupt source numbers to the logical partition for interrupts raised by the I/O adapter 210. Each such logical interrupt source number is associated with one of the physical interrupt source numbers that is associated with the MSI address of the I/O adapter. Such mappings may be stored in records of a logical interrupt table 218 located in the hypervisor 112. Each record in the logical interrupt table 218 includes an association of a physical interrupt source number (PISN) to a logical interrupt source number (LISN) 220. The LISNs 220 may be grouped together with their associated virtual machine (VM) 222 or virtual function (VF). The hypervisor 112, after receiving the physical interrupt source number from the PCI host bridge 130, then translates the physical interrupt source number to a corresponding logical interrupt source number (LISN). The Hypervisor 112 then provides an interrupt 224 to the logical partition 120 with the logical interrupt source number (LISN). The logical partition 120, then handles the interrupt. The interrupt may be handled by a device driver (not shown) associated with the adapter in the logical partition.

Figure 3:
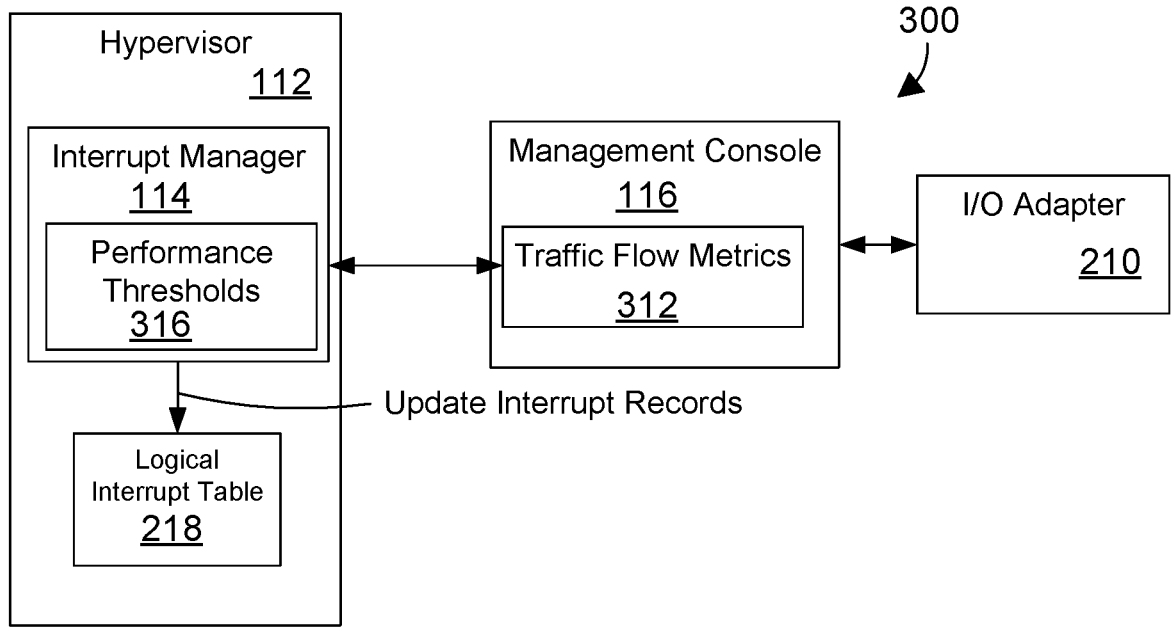
FIG. 3 is a block diagram of a computing system with an interrupt manager that dynamically assigns interrupts to a virtual machine from an input/output (I/O) adapter based on I/O metrics of the I/O adapter.

FIG. 3 is a simplified block diagram that represents a system 300 for dynamic assignment of interrupts based on I/O metrics of an I/O adapter. The system 300 may be implemented with the example system shown in FIG. 1. The entities shown in FIG. 3 correspond to the entities of the same name and reference designators as shown in FIG. 1. The management console 116 gathers traffic flow metrics 312 of the I/O adapter 210 in a manner as known in the prior art or as developed in the future. The traffic flow metrics 312 may include metrics such as: latency of data transfers, usage levels of an adapter I/O path, interrupt rate (e.g., interrupts/second) and transfer rate (e.g., transfers per second of a data path). The interrupt manager 114 monitors the input/output adapter traffic flow metrics 312. The interrupt manager 114 determines when a traffic flow metric of a VM traffic path meets a predetermined performance threshold 316. The predetermined thresholds may include one or more thresholds for each traffic flow metric 312. The interrupt manager 114 obtains a traffic flow metric and compares it to a corresponding predetermined threshold 316. When a traffic flow metric 312 meets or exceeds a predetermined threshold 316, the interrupt manager 114 updates virtual interrupt assignments in the logical interrupt table 218 as described further below. Thresholds could include: a latency for a specific data transfer taking more than 0.2 ms may indicate the virtual machines needs additional interrupts, or a data usage level of an I/O adapter exceeding 90% similarly may indicate the virtual machines needs additional interrupts while a usage level less than 50% may indicate the virtual machine could use fewer interrupts. In other examples, a threshold of greater than 500 transfers per second could indicate a virtual machine needs additional interrupts while less than 100 transfers per second could indicate fewer interrupts are needed.

Figure 4:
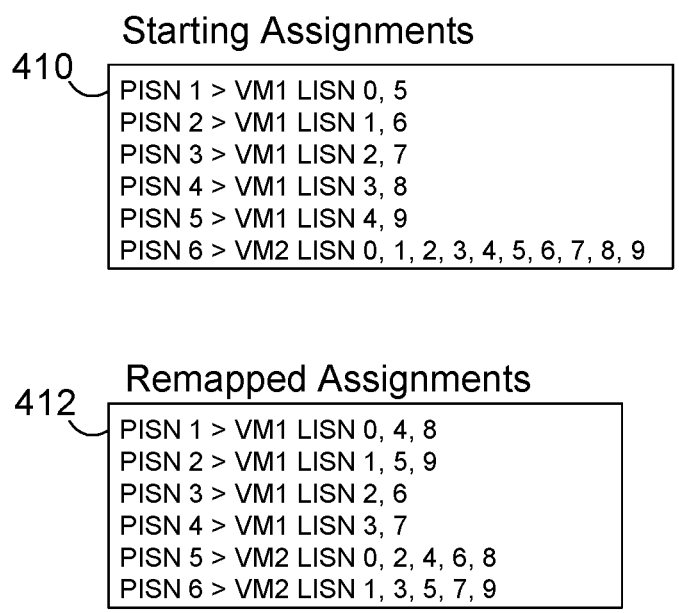
FIG. 4 is an example of dynamically assigning interrupts to a virtual machine from an input/output (I/O) adapter based on I/O metrics of the I/O adapter.

FIG. 4 illustrates an example of updating virtual interrupt assignments when a traffic flow metric meets a predetermined threshold. For this example, we assume the starting assignments for the interrupts are as shown in the starting assignments box 410. When a traffic flow metric 312 meets a predetermined threshold as described above, the interrupt manager 114 (FIG. 1) first determines which VM needs more physical interrupts. In this example, VM2 has been determined to have greater traffic, and needs an increase in interrupts based on a threshold such as latency. Alternatively, VM2 may have a high usage level that indicates VM2 needs additional interrupts. The interrupt manager 114 then determines which VM has underutilized interrupts. In this example, VM1 is determined to have underutilized interrupts and thus may have the number of physical interrupts assigned to it reduced. The interrupt manager 114 then inserts an error state to halt traffic on the I/O adapter bus. In this example, the interrupt manager 114 creates an extended error handling (EEH) error state to affected PCIe devices to stop all traffic to the devices so the remapping can proceed. During the error state, an internal state in the hypervisor is set so that when the OS or other entity (VM/LPAR/Device Driver) requests information regarding the EEH event, it is informed that the hypervisor is performing actions and recovery cannot begin. Determining a VM is underutilized or needs more interrupts may be determined by comparing traffic flow metrics to the predetermined thresholds 316 as described above or other suitable means.

Continuing the example of FIG. 4, after entering the error state, the interrupt manager 114 unmaps all Logical ISNs for affected devices from the physical ISNs. Thus the physical ISNs 1 through 6 are no longer associated with any LISNs and the VM1 LISNs 0→9 and VM2 LISNs 0→9 are not associated with any PISN. The interrupt manager 114 then creates the new mappings for the PISNs in the interrupt hardware. In this example, the interrupt manager creates the PISN to MSI mapping as follows: PISNs 1→4 are associated with VM1's device and PISNs 5, 6 are associated with VM2's device. The interrupt manager then maps LISNs for each VM to the PISNs as shown in the remapped assignments 412 in FIG. 4. The interrupt manager then allows the error state to be recovered by the OS. This can be done by updating an internal state in the hypervisor. The next time the OS checks on the EEH error state, it then sees that it can begin device recovery. This applies for both the VM1 device(s) using LISNs 0→9 and VM2 Device using LISNs 0→9. The OS then reinitializes the PCIe device.

Figure 5:
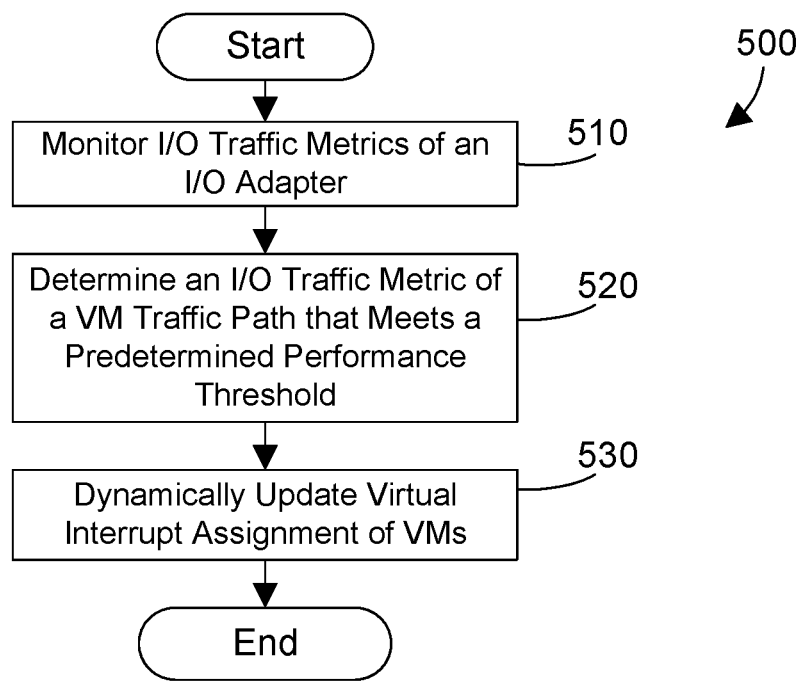
FIG. 5 is a flow diagram of a method for dynamically assigning interrupts to a virtual machine from an input/output (I/O) adapter based on I/O metrics.

Referring to FIG. 5, a method 500 shows one suitable example for dynamic assignment of interrupts to a virtual machine from an input/output (I/O) adapter based on I/O metrics of the I/O adapter. The steps of method 500 are preferably performed by the interrupt manager 114. First, monitor I/O traffic metrics of an I/O adapter (step 510). Next, determine an I/O traffic metric of a VM traffic path meets a predetermined threshold (step 520). When an I/O traffic metric meets a predetermined threshold, update virtual interrupt assignments of the VMs (step 530). The method is then done.

Figure 6:
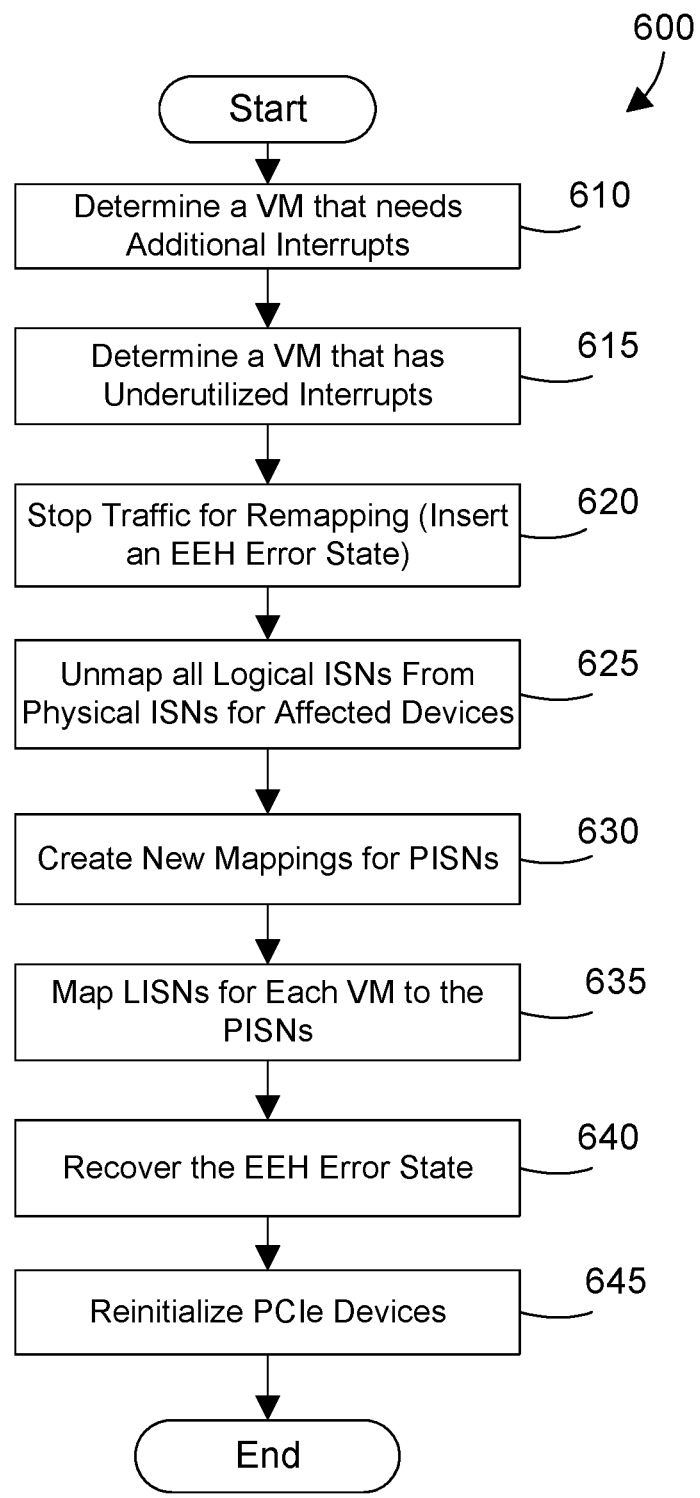
FIG. 6 is a flow diagram of that shows an example of step 530 in method 500.

Referring to FIG. 6, a method 600 shows one suitable example for updating virtual interrupt assignments of the VMs. Thus, method 600 shows one suitable example for step 530 in method 500. The steps of method 600 are preferably performed by the interrupt manager 114 and the operating system. First, determine which VM needs additional physical interrupts (step 610). Then determine which VM has underutilized interrupts (step 615). Next, stop traffic for remapping by inserting an EEH error state (step 620). Unmap all Logical ISNs for affected devices from the physical ISNs (step 625). Create new mappings for the PISNs in the interrupt hardware (step 630). Then map LISNs for each VM to the PISNs (step 635). Recover from the EEH Error State (step 640). Then reinitialize the PCIe devices (step 645). The method is then done.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The claims and disclosure herein support an apparatus comprising: at least one processor; a memory coupled to the at least one processor; a hypervisor residing in the memory and executed by the at least one processor, where the hypervisor uses a logical interrupt table that contains logical interrupt source numbers directly mapped with physical interrupt source numbers; and an interrupt manager in the hypervisor that dynamically assigns interrupts to a virtual machine from an input/output adapter based on input/output traffic metrics of the input/output adapter by making updates to the logical interrupt table and dynamically updates virtual interrupt assignments for the virtual machine by making updates to the logical interrupt table based on a monitored input/output traffic of the input/output adapter meeting a predetermined threshold.

The claims and disclosure herein further support a computer-implemented method executed by at least one processor of assigning interrupts, the method comprising: monitoring traffic metrics of a traffic path from an input/output adapter to a virtual machine; determining when a first monitored traffic metric meets a predetermined performance threshold; dynamically assigning interrupts to a virtual machine from the input/output adapter based on the monitored traffic metrics by making updates to a logical interrupt table in a hypervisor; and based on the first monitored traffic metric meeting the predetermined performance threshold, dynamically updating virtual interrupt assignments for the virtual machine by making updates to the logical interrupt table based on the first monitored traffic metric meeting the predetermined threshold.

The claims and disclosure herein additionally support a computer-implemented method executed by at least one processor of assigning interrupts, the method comprising: instantiating a plurality of logical partitions; deploying an I/O adapter to one of the plurality of logical partitions; creating a mapping of virtual interrupt assignments that maps logical interrupt source numbers to physical interrupt source numbers; monitoring traffic metrics of a traffic path from an input/output adapter to a virtual machine, wherein the traffic metrics comprise latency of data transfers, usage levels of an adapter input/output (I/O) path, and transfers per unit of time; dynamically assigning interrupts to a virtual machine from the input/output adapter based on the monitored traffic metrics by making updates to a logical interrupt table in a hypervisor; determining when a monitored traffic metric meets a predetermined performance threshold; dynamically updating virtual interrupt assignments to the virtual machine from the input/output adapter wherein the virtual interrupt assignments are located in the logical interrupt table in a hypervisor and contain logical interrupt source numbers associated with physical interrupt source numbers; and stopping traffic while updating the virtual interrupt assignments by generating an error state on a data bus.

As described above, a system and method dynamically assig interrupts to a virtual machine from an input/output (I/O) adapter based on I/O metrics of the I/O adapter. An interrupt manager monitors I/O adapter traffic flow metrics and determines when a traffic flow metric for a virtual machine meets a predetermined performance threshold and updates virtual interrupt assignments in a logical interrupt table to improve performance of the system.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
    at least one processor;
    a memory coupled to the at least one processor;
    a hypervisor residing in the memory and executed by the at least one processor, where the hypervisor uses a logical interrupt table that contains logical interrupt source numbers directly mapped with physical interrupt source numbers; and
    an interrupt manager in the hypervisor that dynamically assigns interrupts to a virtual machine from an input/output adapter based on input/output traffic metrics of the input/output adapter by making updates to the logical interrupt table and dynamically updates virtual interrupt assignments for the virtual machine by making updates to the logical interrupt table based on a monitored input/output traffic of the input/output adapter meeting a predetermined threshold,
    wherein the interrupt manager monitors the input/output traffic metrics of a traffic path from the input/output adapter to the virtual machine and determines when a monitored input/output traffic metric meets the predetermined performance threshold.

2. The apparatus of claim 1 wherein the logical interrupt table contains logical interrupt source numbers associated with physical interrupt source numbers.

3. The apparatus of claim 1 wherein interrupt manager stops traffic while updating the virtual interrupt assignments by generating an error state on a data bus.

4. The apparatus of claim 3 wherein the data bus is a peripheral component interconnect express (PCIe) bus.

5. The apparatus of claim 1 wherein the input/output traffic metrics comprise latency of data transfers, usage levels of an adapter input/output (I/O) path, and transfers per unit of time.

6. The apparatus of claim 1 wherein the input/output adapter is a single-root I/O virtualization adapter.

7. A computer-implemented method executed by at least one processor of assigning interrupts, the method comprising:
    monitoring traffic metrics of a traffic path from an input/output adapter to a virtual machine;
    determining when a first monitored traffic metric meets a predetermined performance threshold;
    dynamically assigning interrupts to a virtual machine from the input/output adapter based on the monitored traffic metrics by making updates to a logical interrupt table in a hypervisor; and
    based on the first monitored traffic metric meeting the predetermined performance threshold, dynamically updating virtual interrupt assignments for the virtual machine by making updates to the logical interrupt table based on the first monitored traffic metric meeting the predetermined threshold,
    wherein interrupt manager stops traffic while updating the virtual interrupt assignments by generating an error state on a data bus.

8. The method of claim 7 wherein the logical interrupt table contains logical interrupt source numbers associated with physical interrupt source numbers.

9. The method of claim 7 wherein the traffic metrics comprise latency of data transfers, usage levels of an adapter input/output (I/O) path, and transfers per unit of time.

10. The method of claim 7 wherein the data bus is a peripheral component interconnect express (PCIe) bus.

11. The method of claim 7 wherein the input/output adapter is a single-root I/O virtualization adapter.

12. The method of claim 7 wherein the steps are performed by the hypervisor.

13. A computer-implemented method executed by at least one processor of assigning interrupts, the method comprising:
    instantiating a plurality of logical partitions;
    deploying an I/O adapter to one of the plurality of logical partitions;
    creating a mapping of virtual interrupt assignments that maps logical interrupt source numbers to physical interrupt source numbers;
    monitoring traffic metrics of a traffic path from an input/output adapter to a virtual machine, wherein the traffic metrics comprise latency of data transfers, usage levels of an adapter input/output (I/O) path, and transfers per unit of time;
    dynamically assigning interrupts to a virtual machine from the input/output adapter based on the monitored traffic metrics by making updates to a logical interrupt table in a hypervisor;
    determining when a monitored traffic metric meets a predetermined performance threshold;
    based on the monitored traffic metric meeting the predetermined performance threshold, dynamically updating virtual interrupt assignments to the virtual machine from the input/output adapter wherein the virtual interrupt assignments are located in the logical interrupt table in a hypervisor and contain logical interrupt source numbers associated with physical interrupt source numbers; and
    stopping traffic while updating the virtual interrupt assignments by generating an error state on a data bus.

14. The method of claim 13 wherein the data bus is a peripheral component interconnect express (PCIe) bus and the input/output adapter is a single-root I/O virtualization adapter.

15. The method of claim 13 wherein the steps are performed by a hypervisor.

* * * * *